United States Patent
Wobser

(10) Patent No.: US 12,251,963 B2
(45) Date of Patent: Mar. 18, 2025

(54) TRACTION BOARD

(71) Applicant: GM GLOBAL TECHNOLOGY OPERATIONS LLC, Detroit, MI (US)

(72) Inventor: James A. Wobser, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 729 days.

(21) Appl. No.: 17/505,310

(22) Filed: Oct. 19, 2021

(65) Prior Publication Data

US 2023/0124379 A1 Apr. 20, 2023

(51) Int. Cl.
*B60B 39/12* (2006.01)
*B60B 39/00* (2006.01)

(52) U.S. Cl.
CPC .............. *B60B 39/12* (2013.01); *B60B 39/00* (2013.01); *B60B 2360/30* (2013.01); *B60B 2900/551* (2013.01); *B60B 2900/721* (2013.01)

(58) Field of Classification Search
CPC ..... B60B 39/12; B60B 39/00; B60B 2360/30; B60B 2900/551; B60B 2900/721
USPC .......................................................... 238/14
See application file for complete search history.

(56) References Cited

U.S. PATENT DOCUMENTS

| | | | | |
|---|---|---|---|---|
| 1,389,400 A | * | 8/1921 | Tufts | B60B 39/12 238/14 |
| 3,119,465 A | * | 1/1964 | Jervis | B60B 15/00 188/5 |
| 3,357,639 A | * | 12/1967 | Peterson | B60B 39/12 238/14 |
| 3,768,599 A | * | 10/1973 | Alexandre | B60B 39/00 188/2 R |
| 4,223,835 A | * | 9/1980 | Witt | B60B 39/12 238/14 |
| 5,439,171 A | | 8/1995 | Fruend | |
| 5,538,183 A | | 7/1996 | McGee | |
| 2011/0002735 A1 | | 1/2011 | Lynn | |

FOREIGN PATENT DOCUMENTS

WO     WO-2006120713 A1     11/2006

* cited by examiner

*Primary Examiner* — Zachary L Kuhfuss

(57) ABSTRACT

A traction board for insertion under a vehicle's tire for freeing the vehicle from a stuck condition includes an elongated board body and an end plate pivotally connected to an end portion of the elongated board body. According to a further aspect, a traction board includes an elongated board body and a finger pivotally connected to the elongated board body and pivotally extending below the elongated board body in order to prevent the elongated board body from sliding rearward.

20 Claims, 2 Drawing Sheets

TRACTION BOARD

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a traction board to be inserted under a tire of a vehicle to assist the tire to gain traction to free itself from a stuck or spinning condition.

SUMMARY

A traction board for insertion under a vehicle's tire for freeing the vehicle from a stuck condition includes an elongated board body and an end plate pivotally connected to an end portion of the elongated board body.

According to a further aspect, a traction board includes an elongated board body and one or more fingers pivotally connected to the elongated board body and pivotally extending below the elongated board body in order to prevent the elongated board body from sliding rearward.

According to another aspect, the elongated board body is rectangular in shape.

According to still another aspect, the elongated board body is made from plastic.

According to still another aspect, the elongated board body is formed with a traction grid.

According to still another aspect, the end plate is made from plastic.

According to still another aspect, the end plate is rectangular in shape.

According to still another aspect, the end plate is pivotally connected to the elongated board body by a pivot pin.

According to another aspect, a method of freeing a vehicle from a stuck condition with at least one wheel of the vehicle unable to obtain traction, includes inserting a traction board under the at least one wheel, the traction board including an elongated board body and an end plate pivotally connected to an end portion of the elongated board.

According to a further aspect, a traction board includes an elongated board body and at least one finger pivotally connected to the elongated board body and pivotally extending below the elongated board body.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
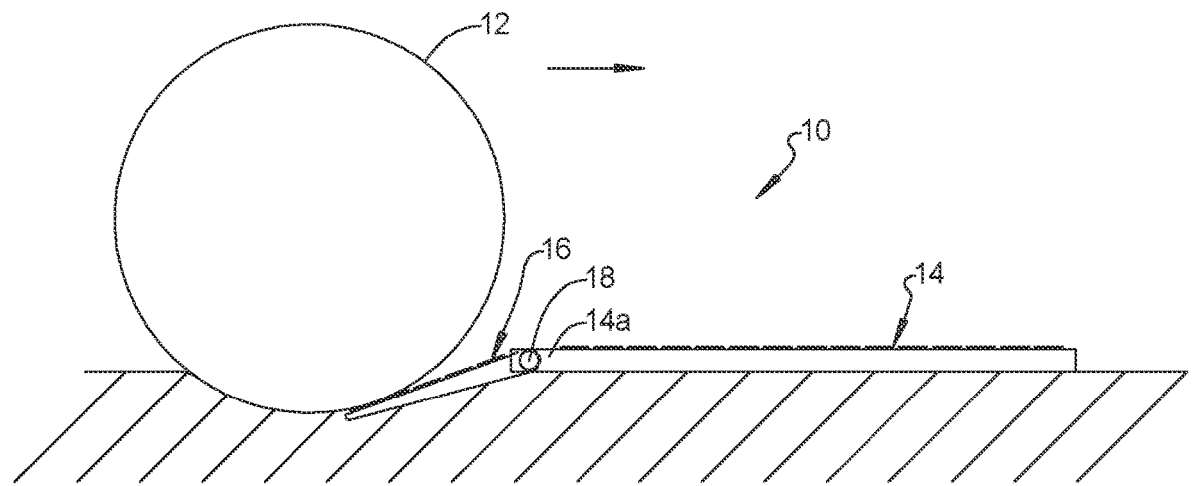
FIG. 1 is a side schematic view of a traction board according to the principles of the present disclosure inserted under a tire of a vehicle to assist the tire in regaining traction to exit a stuck condition.
Figure 2:
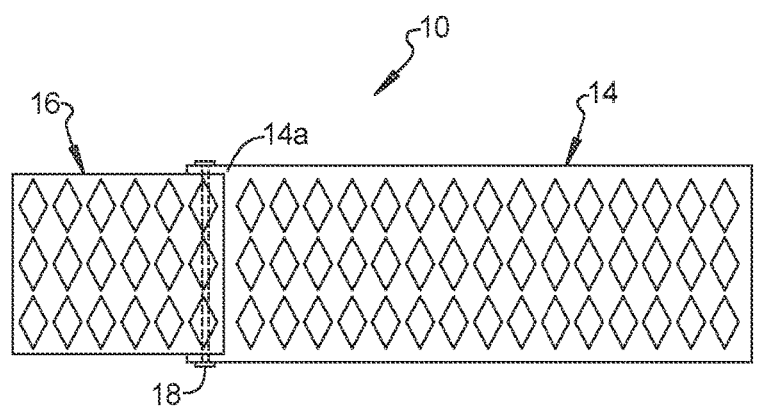
FIG. 2 is a top plan view of the traction board of FIG. 1.

With reference to FIG. 1, a traction board assembly 10 is shown being inserted under a vehicle tire 12 to assist the tire 12 to regain traction from a stuck condition. As shown in FIGS. 1 and 2, the traction board assembly 10 includes an elongated board body 14 that has a width of between 10 and 14 inches and more particularly approximately 12 inches and can have a length of between 36 and 60 inches and more particularly approximately 48 inches.

An end plate 16 is pivotally attached to an end 14*a* of the elongated board body 14. The elongated board body 14 and the end plate 16 can both be made from plastic or metal and can be pivotally connected to one another by a pivot pin 18. The elongated plastic or metal body 14 and end plate 16 can include a traction grid formed thereon.

The hinged end plate 16 is designed to prevent the traction board assembly 10 from becoming buried in a soft surface. In particular, the end plate 16 will have a tendency to rotate into an upwardly pivoted position (clockwise as illustrated in FIG. 1) when the elongated board body 14 of the traction board assembly 10 begins to slip rearward to prevent the end to the elongated board body 14 from becoming buried in the soft surface. The end plate 16 can have a pointed tip to facilitate easier insertion under an edge of a tire.

Figure 3:
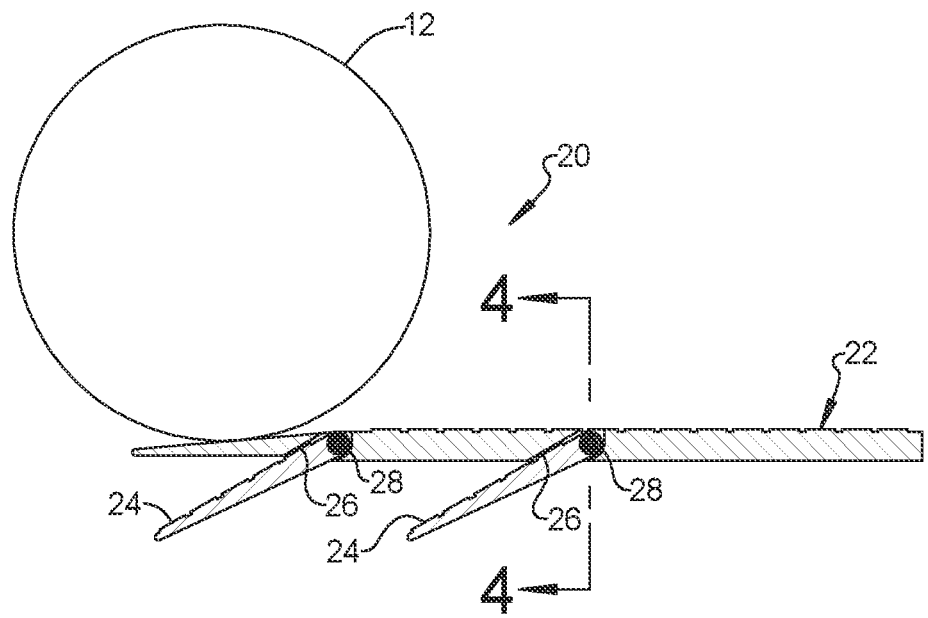
FIG. 3. side schematic view of a traction board according to a second embodiment of the present disclosure inserted under a tire of a vehicle to assist the tire in regaining traction to exit a stuck condition.
Figure 4:
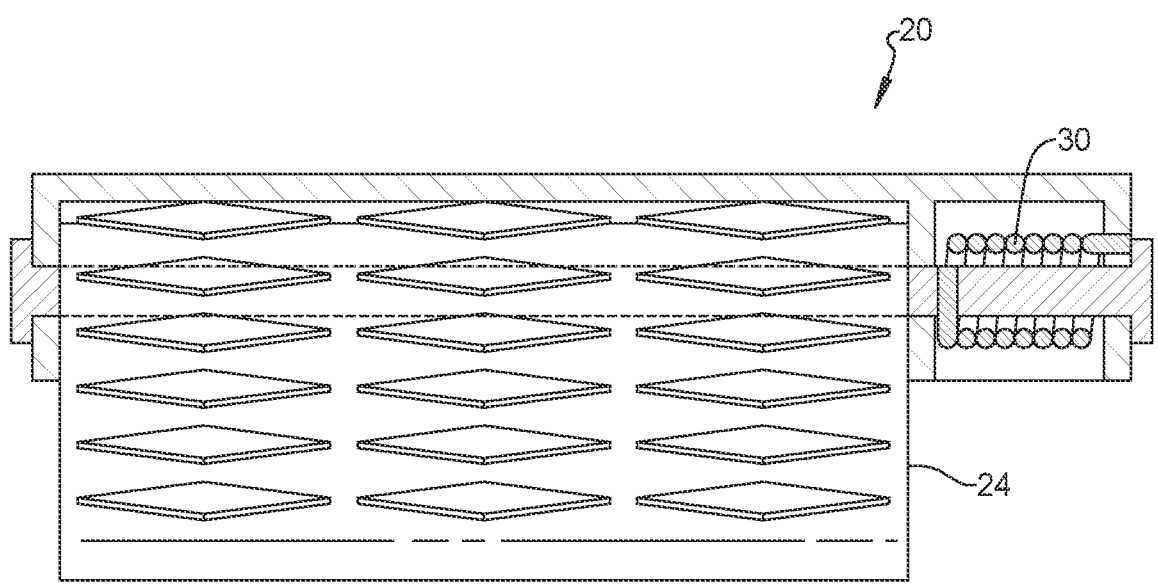
FIG. 4 is a cross-sectional view of the traction board of FIG. 3 showing the pivot support of a finger mounted to the traction board.

With reference to FIGS. 3 and 4, a second embodiment of a traction board assembly 20 is shown for insertion under a vehicle tire 12 to assist the tire 12 to regain traction from a stuck condition. The traction board assembly 20 includes an elongated board body 22 that can have a width of between 10 and 14 inches and more particularly approximately 12 inches and can have a length of between 36 and 60 inches and more particularly approximately 48 inches.

One or more finger(s) 24 are pivotally attached to the elongated board body 22 to extend below the elongated board body 22. The elongated board body 22 includes a rotation stop 26 that limits the rotation of the finger(s) 24 about a pivot pin 28. The elongated board body 22 and the finger 24 can both be made from plastic or metal. The finger(s) 24 is (are) designed to prevent the traction board assembly 20 from being pushed rearward and becoming buried in a soft surface.

When the elongated board body 22 is displaced rearwardly, the loose material will have tendency to open the fingers, increasing the effective reaction area and prevent the board body 22 from getting buried in the surface. The elongated board body can have a pointed tip to facilitate easier insertion under a tire. A torsion spring 30 can bias the finger(s) in a downward direction to improve its engagement with the ground surface. The stop surface 26 can prevent the fingers 24 from opening beyond a certain point.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A traction board comprising:
   an elongated board body having a first side, a second side, and an end extending between the first side and the second side;
   one or more fingers pivotally attached to one of the first side and the second side of the elongated board body, wherein the one or more fingers is pivotally connected to the elongated board body by a pivot pin; and
   a torsion spring disposed about the pivot pin, the torsion spring being configured to bias the one or more fingers in a downward direction.

2. The traction board according to claim 1, wherein the elongated board body is rectangular in shape.

3. The traction board according to claim 1, wherein the elongated board body is made from plastic.

4. The traction board according to claim 1, wherein the elongated board body is formed with a traction grid.

5. The traction board according to claim 1, wherein the one or more fingers is made from plastic.

6. The traction board according to claim 1, wherein the one or more fingers includes a tapered cross-section.

7. The traction board according to claim 1, wherein the one or more fingers includes a first finger mounted to the first side of the elongated board body and a second finger mounted to the first side of the elongated board body spaced from the first finger.

8. The traction board according to claim 1, wherein the one or more fingers are made from one of plastic and metal.

9. The traction board according to claim 1, further comprising a limit stop surface that limits the angular movement of the one or more fingers.

10. A method of freeing a vehicle from a stuck condition with at least one wheel of the vehicle unable to obtain traction, comprising;
    inserting a traction board under the at least one wheel, the traction board including an elongated board body having a first side, a second side, an end extending between and connecting the first side and the second side, and one or more fingers pivotally mounted to one of the first side and the second side, wherein the one or more fingers is pivotally connected to the elongated board body by a pivot pin; and
    disposing a torsion spring about the pivot pin, the torsion spring being configured to bias the one or more fingers in a downward direction.

11. The method according to claim 10, wherein the elongated board body is rectangular in shape and made from plastic.

12. A traction board comprising:
    an elongated board body having a first side, a second side, and an end extending between the first side and the second side, wherein the end of the elongated board body includes a taper; and
    at least one finger pivotally connected to the elongated board body at one of the first side and the second side adjacent to the end, the at least one finger having a tapered cross-section having a taper that corresponds to the taper of the end of the elongated board body.

13. The traction board according to claim 12, wherein the elongated board body is rectangular in shape.

14. The traction board according to claim 12, wherein the elongated board body is made from plastic.

15. The traction board according to claim 12, wherein the elongated board body includes a traction grid.

16. The traction board according to claim 12, wherein the at least one finger is made from one of plastic and metal.

17. The traction board according to claim 12, further comprising a limit stop surface that limits the angular movement of the at least one finger.

18. The traction board according to claim 12, further comprising a pivot pin pivotally securing the at least one finger to the first side and the second side and a torsion spring provided about the pivot pin, the torsion spring being configured to bias the at least one finger toward an extended position extending below the elongated board body.

19. The traction board according to claim 12, wherein the at least one finger includes a first finger mounted to the first side of the elongated board body and a second finger mounted to the first side of the elongated board body spaced from the first finger.

20. The traction board according to claim 19, wherein each of the first finger and the second finger includes a tapered cross-section having a taper that corresponds to the taper of the end of the elongated board body.

* * * * *